United States Patent [19]
Johnston

[11] Patent Number: 4,686,597
[45] Date of Patent: Aug. 11, 1987

[54] ROTATING HEAD APPARATUS INCLUDING A FLYING TAPE EDGE GUIDE

[75] Inventor: Ross W. Johnston, Norristown, Pa.

[73] Assignee: RCA Corporation, Princeton, N.J.

[21] Appl. No.: 780,901

[22] Filed: Sep. 27, 1985

[51] Int. Cl.⁴ .............................................. G11B 15/60
[52] U.S. Cl. ........................... 360/130.23; 360/130.24
[58] Field of Search ..................... 360/130.22–130.23, 360/130.24, 102, 84, 85

[56] References Cited

U.S. PATENT DOCUMENTS

| | | | |
|---|---|---|---|
| 3,378,646 | 4/1968 | Shashoua et al. | 179/100.2 |
| 3,643,849 | 2/1972 | Roberts | 226/199 |
| 3,840,894 | 10/1974 | Arseneault | 360/84 |
| 3,867,725 | 2/1975 | Janssen et al. | 360/102 |
| 3,893,176 | 7/1975 | Jones | 360/70 |
| 3,900,891 | 8/1975 | Griffiths et al. | 360/84 |
| 3,902,192 | 8/1975 | Laenen et al. | 360/84 |
| 3,911,490 | 10/1975 | Kostin et al. | 360/84 |
| 3,912,144 | 10/1975 | Arseneault et al. | 226/3 |
| 3,939,493 | 2/1976 | Fowler et al. | 360/84 |
| 3,961,369 | 6/1976 | Baumann et al. | 360/84 |
| 3,984,039 | 10/1976 | Hawley et al. | 226/97 |
| 3,995,318 | 11/1976 | Serizawa | 360/130 |
| 3,996,615 | 12/1976 | Nelson et al. | 360/102 |
| 4,015,291 | 3/1977 | Stevenson et al. | 360/102 |

FOREIGN PATENT DOCUMENTS

| | | | |
|---|---|---|---|
| 41-2025 | 2/1966 | Japan | 360/130.24 |
| 275662 | 12/1965 | United Kingdom | 360/130.24 |

Primary Examiner—A. J. Heinz
Attorney, Agent, or Firm—Clement A. Berard, Jr.; William H. Meise; Christopher L. Maginniss

[57] ABSTRACT

A tape recording/retrieving system includes a tape helically-wrapped about a cylindrical headwheel. When the headwheel rotates, the tape is hydrodynamically lifted above the rotating surface of the headwheel. A plurality of tape edge guides, illustratively three, disposed about the circumference of the headwheel, provide support surfaces for the tape. The edge guides include surfaces adjacent the cylindrical headwheel surface which are also subject to hydrodynamic forces when the headwheel rotates, causing the edge guides to "fly" away from the rotating surface, thus reducing wear problems on the headwheel and the guides. Using a knowledge of the system parameters, the edge guides are fabricated with a prestress so that they fly at a particular distance above the rotating surface which provides a supporting surface for the flying tape.

20 Claims, 7 Drawing Figures

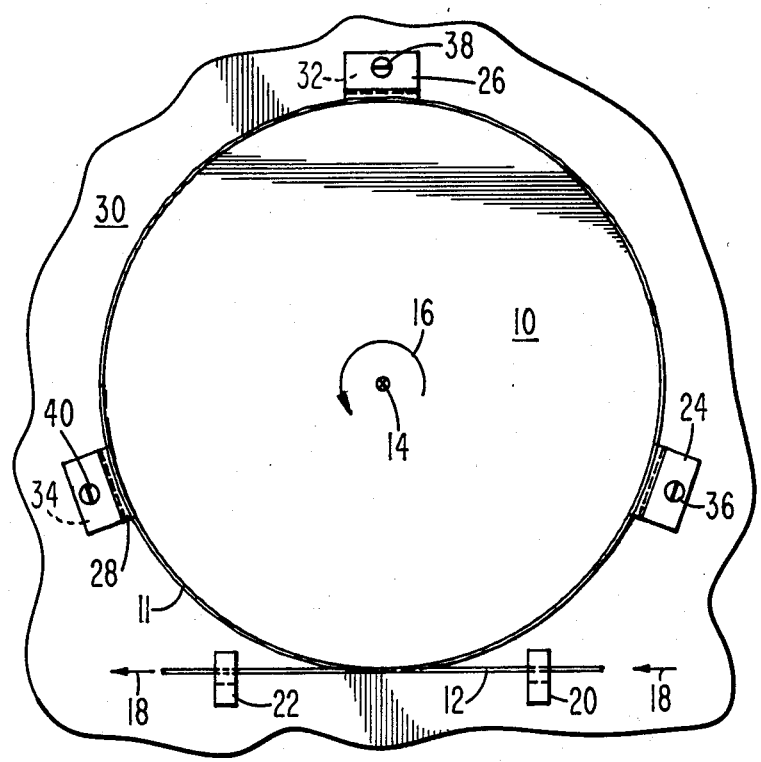
Fig. 2
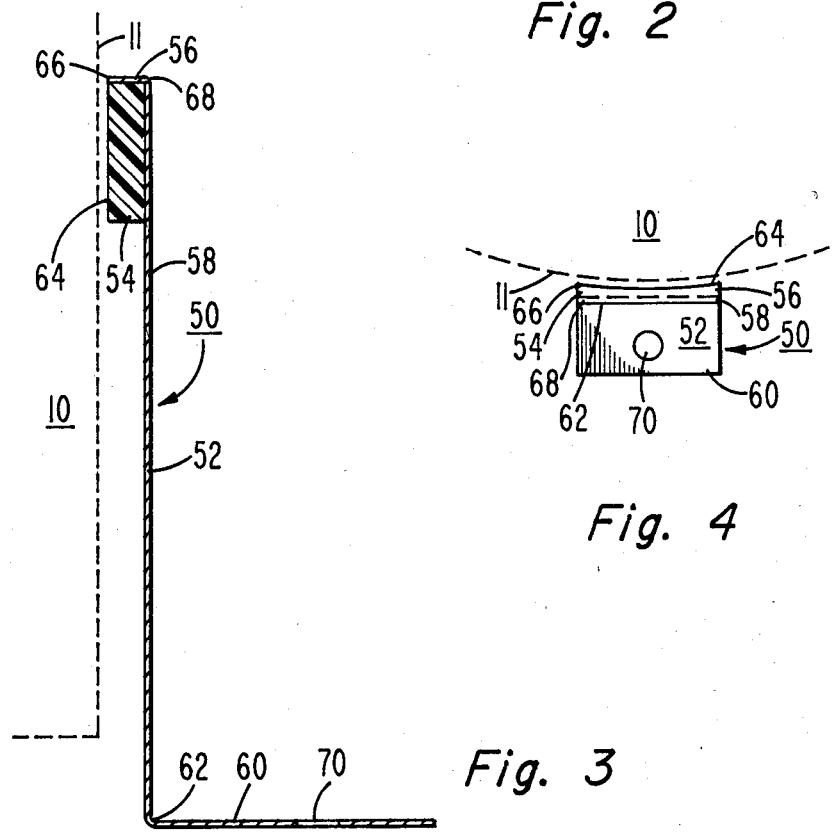
Fig. 4
Fig. 3

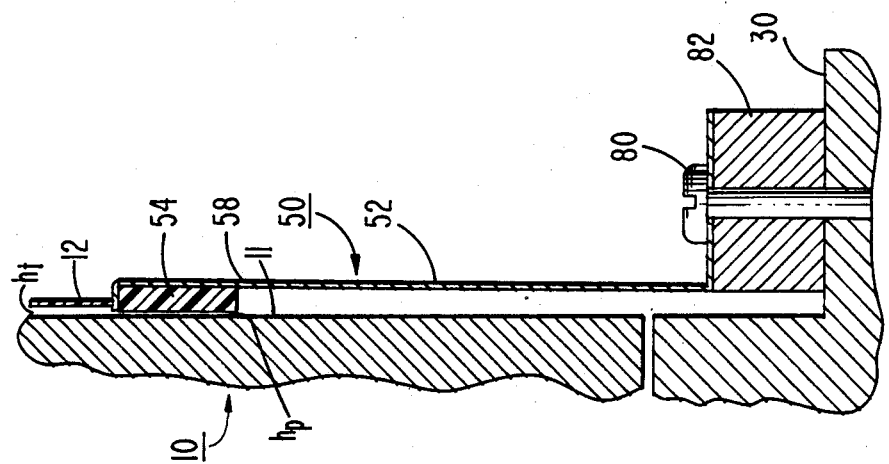
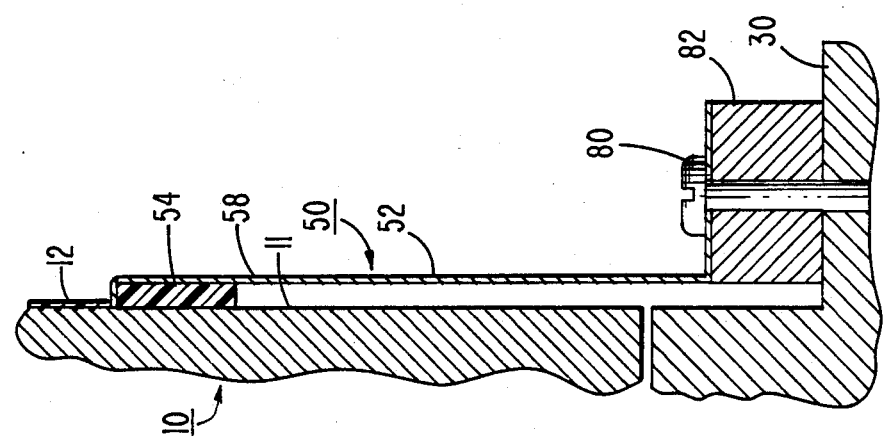
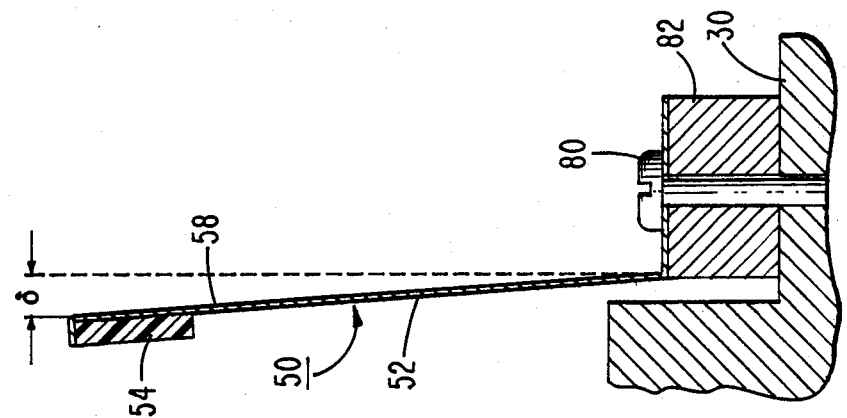

ROTATING HEAD APPARATUS INCLUDING A FLYING TAPE EDGE GUIDE

The Government has rights in this invention pursuant to a Government Contract.

This invention relates generally to rotating head tape recording/retrieving systems and, more particularly, to a tape recording/retrieving system in which both the tape and a set of tape edge guides disposed about the headwheel are hydrodynamically lifted above the rotating surface of the headwheel.

BACKGROUND OF THE INVENTION

Various information recording and retrieving systems are known in which a magnetically-sensitive or optically-sensitive tape is made to describe a helical path around the periphery of a structure, usually of cylindrical construction, and including one or more information recording/retrieving devices. Such systems are referred to as helical scan recording systems. The tape may completely encircle the structure so that a tape helix of 360° or more is developed.

The information recording/retrieving devices, which may be magnetic or optical heads, for example, are made to rotate at constant speed and in a fixed plane at right angles to the longitudinal axis of the structure around which the tape is driven. Because of the orientation of the tape relative to the axis of the support structure, a helix angle exists between the rotating information recording/retrieving devices and the direction of tape travel. The angle is governed by the width of the tape and by the diameter of the structure supporting the tape helix. Each information recording/retrieving device scans diagonally across the width of the tape. An information signal fed to the recording/retrieving device is recorded on, and can be reproduced from, a succession of parallel, equal-length tracks, each extending at the same angle across the width of the tape.

In recent years there has been extensive progress in the area of high density recording on light and thermal sensitive tapes. Optical tape media using magneto-optic and reversible crystalline state techniques for erasable recordings, as well as ablative techniques for permanent or archival recordings, are in current use and development.

The recording surface of an optical tape medium includes a coating which is extremely subject to wear. Because of this, the sensitive tape surface cannot be dragged across another surface. As a result, optical tapes are generally caused to "fly" above the peripheral surface of the cylindrical structure, generally referred to as a headwheel, on a stable gas bearing, which generally comprises a compressible fluid, such as air. The bearing may be generated hydrostatically or hydrodynamically. As used in the art the term "hydrostatic" is equivalent to the term "externally-pressurized," and the term "hydrodynamic" is equivalent to the term "self-generated."

Helical-scan tape recording/retrieving systems are subject to peculiar guidance problems, such as tape skew and lateral displacement of the tape. Where a tape is forced out of contact with the headwheel by an air film bearing, the need for accurate tape guidance becomes even more acute. When the conditions of tape skew and lateral displacement do occur, the information recording/retrieving device may be out of tracking position or misaligned with respect to the recorded information tracks. In such a case, the information signal which is retrieved will suffer from low amplitude, or distortion caused from the adjacent data tracks. These undesirable results become severe as track density is increased.

There are many helical tape systems in which the tape, or a portion thereof, is supported on an air bearing where it wraps about the headwheel. Some systems employ hydrostatic forces, some employ hydrodynamic forces, and some use a combination of the two. It will be noted that a headwheel configured to provide a hydrostatic air bearing is more expensive to produce and also requires an external source of pressurized air.

In some helical tape systems, the headwheel is divided into fixed and rotating sections. The rotating portion includes the recording/retrieving device and generally provides a hydrodynamic air bearing, although some systems have implemented hydrostatic support through the rotating portion. The width of the rotating portion is generally determined by the type of force used to generate the bearing. There are systems in which the rotating portion is very narrow, and hydrostatically-generated bearings above and below it provide tape support. In other systems, hydrodynamic support is provided for the top half of the wrap but not for the bottom half, in order to provide tape edge guidance around the headwheel.

At the present time, there is no system known to the applicant which provides hydrodynamic tape support across the entire tape width while providing edge guidance to the tape along the helical wrap.

SUMMARY OF THE INVENTION

In accordance with the principles of the present invention, a tape recording/retrieving system includes a fixed base structure and a rotating headwheel. A tape, wrapped in a single helix about a cylindrical surface of the rotating headwheel, is hydrodynamically lifted away from the cylindrical surface. There is disclosed an apparatus comprising a flexible arm fixed at one end to the base structure and having a second end free to move toward or away from the headwheel. The apparatus further comprises means coupled to the free end of the flexible arm for supporting the tape. The supporting means has a first surface adapted to support the tape and a second surface in close facing relation to the cylindrical surface. The flexibility of the flexible arm and the dimensions of the supporting means second surface are determined such that the hydrodynamic force between the second surface and the headwheel generated by the rotation of the headwheel deflects the free end of the flexible arm, thereby displacing the second surface of the supporting means away from the rotating cylindrical surface.

BRIEF DESCRIPTION OF THE DRAWING

FIG. 2 is a top view of the system of FIG. 1 looking down along the headwheel axis of rotation;

FIG. 3 is a cross-sectional side view of one tape edge guide of the FIG. 1 embodiment;

FIG. 4 is a top view detail drawing of one tape edge guide of the FIG. 1 embodiment; and FIGS. 5a, 5b and 5c are cross-sectional side views including one tape edge guide, wherein in FIG. 5a, the headwheel is removed; in FIG. 5b, the headwheel is at rest; and in FIG. 5c, the headwheel is rotating.

DETAILED DESCRIPTION OF THE PREFERRED EMBODIMENT

Figure 1:
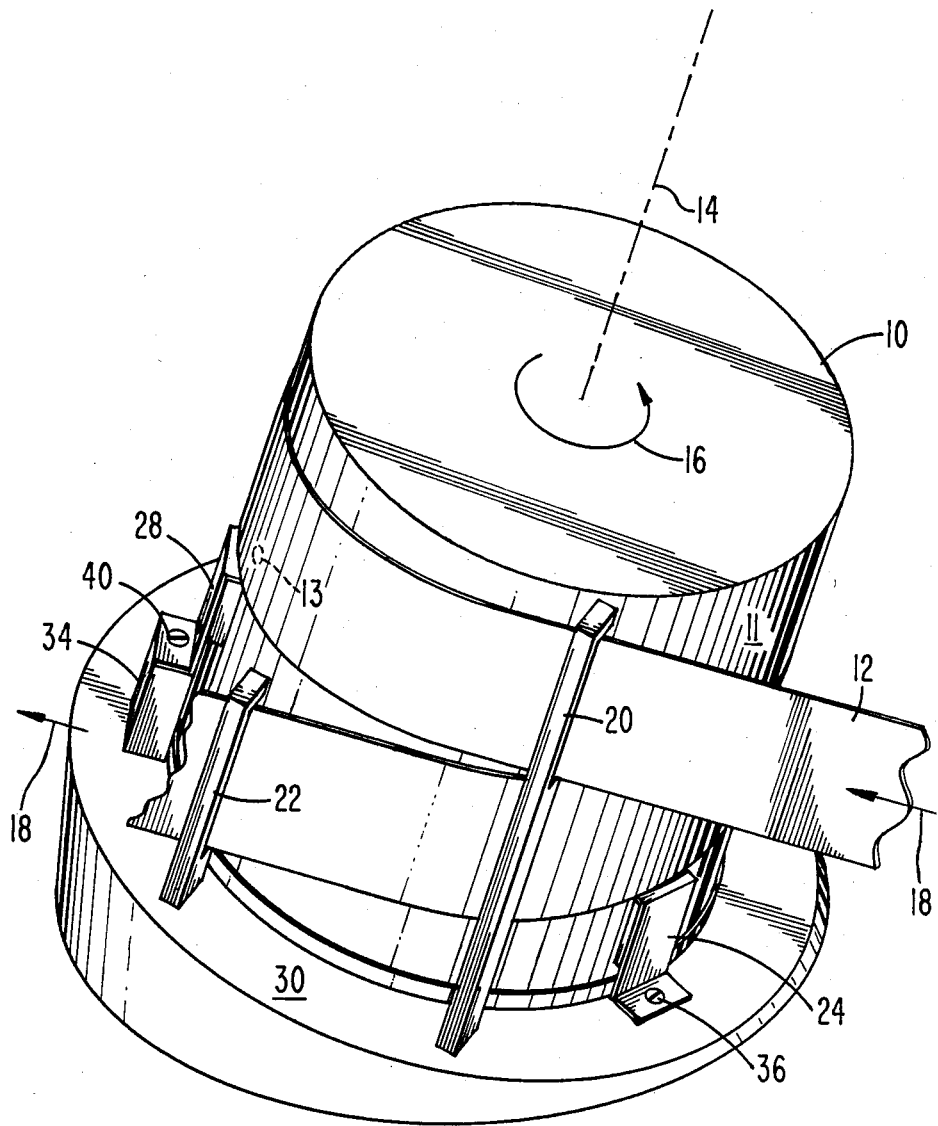
FIG. 1 illustrates a rotating headwheel assembly for use with a helically-wrapped tape, including flying tape edge guides, according to the present invention.

Referring to FIGS. 1 and 2, which represent different views of the same headwheel assembly for use in a tape recording/retrieving system, there is shown headwheel 10 in relation to helically-wrapped tape 12. The entirety of headwheel 10 is rotatable about central axis 14 in the direction shown by arrow 16. Headwheel 10 is substantially cylindrical along peripheral surface 11. In the present example, headwheel 10 has a diameter of 5.3 inches (13.46 centimeters), and rotates with a peripheral velocity of 70 inches/sec., (178 cm/sec.) measured at rotating surface 11.

Tape 12 is wrapped in a single helix about headwheel 10 using what is commonly referred to as an "α" wrap. Tape 12 is movable along the direction shown by arrows 18, and is edge guided onto headwheel 10 by fixed entrance pylon 20. It is edge guided off headwheel 10 by fixed exit pylon 22. Pylons 20 and 22 are unyieldingly fixed in position.

Headwheel 10 includes transducing elements (not shown) by which information is recorded onto tape 12 or previously-stored information is retrieved from tape 12. In the case of a system using optical media, the recording and retrieving processes involve illuminating small regions on the optically-sensitive surface of tape 12. In the present embodiment, the illumination of tape 12 is facilitated by window 13 in peripheral surface 11 of headwheel 10. As headwheel 10 rotates (rapidly), and tape 12 moves (slowly, in the opposite direction), the illumination through window 13 defines a series of long, diagonal, parallel paths, extending substantially across the entire width of tape 12.

In the region where tape 12 is wrapped about headwheel 10, it is supported by a plurality, for example, three in the illustrated embodiment, edge guides 24, 26 and 28, which are virtually identical. Edge guides 24, 26 and 28, as well as pylons 20 and 22, are all mounted to a support structure 30 which is rigidly fixed in position. Pylons 20 and 22 and edge guides 24, 26 and 28 are relatively positioned such that a support surface is provided to tape 12 at approximately every five inches.

Edge guides 26 and 28 are mounted to support structure 30 through height adjustment members 32 and 34, respectively, of appropriately increasing size, so that each guide 24, 26 and 28 contacts the lower edge of tape 12 at the proper height for that sector of rotating headwheel 10. (Height adjustment member 32 is not actually visible in the views presented by FIGS. 1 and 2.) Edge guides 24, 26 and 28 are each shown as being fastened to support structure 30 by a single machine screw 36, 38 and 40, respectively; however, any suitable fastening means may be used.

Referring now to FIGS. 3 and 4, there are shown detailed views of one tape edge guide 50. FIG. 3 illustrates edge guide 50 from a cross-sectional side view, and FIG. 4 is a top view. The same or similar parts are given identical reference designation numerals in the two figures. It will be noted that these figures do not exhibit exact dimensional proportionality. Certain dimensions therein are highly exaggerated for ease of understanding. Typical examples of all significant dimensions, however, are provided throughout the text of this disclosure.

Tape edge guide 50 comprises spring member 52, pad 54, and cap member 56. Spring member 52, which may typically be fabricated from a metallic substance, illustratively from a strip of spring tempered #303 stainless steel, having a thickness of 0.005 inch (0.13 millimeter), includes two planar sections 58 and 60, offset at approximately 90° from one another as a result of a preformed angle at location 62. Planar section 58 may typically be 1.0 inch (25.4 mm) in length and 0.750 inch (19.05 mm) in width.

Pad 54 is typically fabricated from a low-friction plastic, such as Delrin, an acetal resin which is a registered trademark of E.I. DuPont de Nemours & Co., Wilmington, Del. As shown in FIG. 3, pad 54 has a generally rectangular cross section, but, with a concave arcuate surface 64, as shown in FIG. 4. The concave arc of surface 64 corresponds to the adjacent convex surface 11 of headwheel 10. Illustrative dimensions for pad 54 may include a height of 0.250 inch (6.35 mm) and a width of 0.750 inch (19.05 mm) along the concave arc. Pad 54 is attached at the end of planar section 58, remote from the preformed angle at 62, by a suitable adhesive. Although pad 54 does not contact headwheel 10 during rotation at operating speed, there is wear between pad 54 and headwheel 10 at lesser speeds—during start-up and turn-off. Thus, it is imperative that the surface of edge guide 50 which contacts surface 11 of headwheel 10 be made of a low-friction material.

Cap member 56 may typically comprise a metallic plating, such as chromium, which is highly polished so as to form an extremely smooth top surface for edge guidance of tape 12. Upper corner 66 adjacent headwheel 10 is ground to a 90° angle, in order to support tape 12 when headwheel 10 provides no outward hydrodynamic forces. Upper corner 68 is smoothly beveled so that tape 12 can be loaded into position atop edge guide 50 while minimizing the possibility of tape fraying or edge wear.

Planar section 60 includes means for affixing edge guide 50 to support structure 30. In the present embodiment, edge guide 50 is held by a machine screw (not shown in FIGS. 3 and 4) through hole 70 in planar section 60.

During operation, the rotation of headwheel 10, at a relatively high velocity, causes a film of air to be developed between rotating surface 11 of headwheel 10 and the inside surface of tape 12. The pressure of this air bearing causes tape 12 to "fly" away from rotating surface 11 of headwheel 10 at some determinable height. According to the present invention, there is also developed a pressurized air film between rotating surface 11 and the adjacent surface 64 of plastic pad 54. Thus, edge guide 50 also flies away from rotating surface 11 of headwheel 10.

The flying force which tends to push tape 12 away from rotating surface 11 is balanced by a tensioning system (not shown) which maintains a constant tension along tape 12 in the region where it is wrapped about headwheel 10. A similar force is needed to counteract the flying force generated against pad 54. Since spring member 52 may be considered a cantilevered beam, the needed counteracting force may be implemented as a preformed angle of spring member 52 at position 62, resulting in a deformation of planar section 58 toward headwheel 10.

Referring to FIG. 5a, there is shown an edge guide 50 mounted via screw 80, through height adjustment member 82, to support structure 30. No headwheel is shown in this drawing so that the actual preformed deflection of spring member 52 may be shown. The deflection, δ, is the deviation of the top end of planar section 58 from an unstressed position to its position when flying away from headwheel 10.

FIG. 5b shows pad 54 of edge guide 50 in a stressed position, where it is urged against non-rotating headwheel 10. Additionally, tape 12, under tension from a tape tensioning apparatus (not shown), is also seen to be urged against non-rotating headwheel 10.

FIG. 5c represents headwheel 10 in a rotational condition at a relatively high velocity. Tape 12 is seen to be hydrodynamically flying away from surface 11 at a flying height of $h_t$. Similarly, pad 54 of edge guide 50 is also seen to be hydrodynamically flying away from surface 11 at a flying height of $h_p$, somewhat less than $h_t$.

The following paragraphs will define the dimensions and operating parameters of an illustrative system including a rotating headwheel having a helically-wrapped flying tape supported by edge guides which also fly away from the surface of the rotating headwheel. The basic procedure to be followed will be to determine the flying height of the tape and then, for an edge guide flying height selected such that it will support the tape, to compute the prestress in the spring member which will produce that flying height.

The following illustrative system dimensions are selected for the computations:
Headwheel radius=2.65 inches;
Peripheral velocity of headwheel=70.0 inches/sec.;
Tape velocity=0.1 inch/sec. (in a direction opposite to the rotation of the headwheel);
Tape width=1.0 inch;
Tape thickness=0.001 inch;
Edge guide pad dimensions=0.750 inch wide by 0.250 inch high;
Length of spring lever=1.0 inch; and
Thickness of spring member=0.005 inch.

From these dimensions it is easily seen that the angle of headwheel arc, θ, covered by the edge guide pad is 16.216 degrees.

The flying height of the tape is computed according to a relationship for self-acting, flexible foil bearings found in *Fluid Film Lubrication*, edited by William A. Gross, John Wiley & Sons, New York, 1980, p. 493. The relationship to be used is $$h_t = 0.643R(6\mu V/T)^{\frac{2}{3}},$$

where $h_t$ is the tape flying height (in inches), R is the headwheel radius (in inches), μ is the viscosity of air (in lb.sec./inch²), V is the relative velocity between the headwheel and tape (in inches/sec.), and T is the tape tension per unit width (in lb./inch). Using the values specified above, as well as $\mu=2.67\times10^{-9}$ lb.sec./inch² and T=0.50 lb. applied against the tape of 1.0 inch width; $h_t$ is computed to be 292 μ inches.

Since it is desired to have the tape rest entirely on the edge guide, it is deemed advisable to fly the edge guide at some lesser height, for example, at 230 μ inches. This practice also allows for a "plowing" effect, as the bearing surface of the edge guide skews very slightly in response to the force of the air bearing film.

It is sufficiently accurate to use the same relationship as above to determine the flying height of the edge guide, but substituting F/2w(sin θ/2) for T, the tension per unit width variable. The equation for F, the bearing force exerted on the edge guide pad by the headwheel rotation, thus works out to $$F = 12\mu\, wV(\sin\theta/2)(0.643R/h_p)^{3/2},$$

where w is the height of the edge guide pad and $h_p$ is the flying height of the pad. Using the values enumerated, and assuming a pad flying height of 230 μ inches, the bearing force against the edge guide spring is computed to be F=0.05043 pounds.

It therefore remains to determine the amount of deflection, δ, of the edge guide spring portion which results from the application of a force of 0.05043 pounds. This will be the spring deflection which must be preformed into the edge guide.

A well known relationship for the deflection of a cantilevered beam is $$\delta = FL^3/3EI,$$

where δ is the beam deflection (in inches), F is the force applied at the free end of the beam (in pounds), L is the beam length (in inches); E is the modulus of elasticity (or Young's modulus), which, for spring tempered #303 stainless steel is $29\times10^6$ lb./inch²; and I is the section inertia (in inches⁴), which can be expressed as $$I = bt^3/12,$$

where b is the cross-sectional width and t the cross-sectional thickness of the beam.

Using the values listed above, the spring portion of the edge guide deflects 0.07419 inch in response to the bearing force developed by the rotating headwheel. Thus, in order to produce the desired flying height of the edge guide pad of 230 μ inches, the edge guide beam must be preformed so as to deflect 0.07419 inch toward the headwheel from the desired flying position.

While the principles of the present invention have been demonstrated with particular regard to the illustrated structure of the figures, it will be recognized that various departures from such illustrative structure may be undertaken in the practice of the invention. As a first example, the cantilevered portion of the edge guide spring member may be arcuately formed to correspond to the headwheel surface, and a thin, low-friction plastic coating, such as Teflon, applied to the inner surface of the spring member. This approach would preclude the need for a distinct plastic pad bonded to the spring member. As a second example, the edge guide spring members may be fabricated entirely from sheet Delrin, illustratively 0.020 inch (0.51 mm) thick. The scope of this invention is therefore not intended to be limited to the structure disclosed herein but should instead be gauged by the breadth of the claims which follow.

What is claimed is:

1. In a tape recording/retrieving system including a fixed base structure and a rotating headwheel, wherein a tape wrapped in a single helix about a cylindrical surface of said rotating headwheel is hydrodynamically lifted away from said cylindrical surface, an apparatus comprising:
   a flexible arm fixed at one end to said base structure and having a second end free to move toward or away from said headwheel;
   means coupled to said flexible arm free end for supporting said tape, said supporting means having a support surface adapted to support said tape; and deflection means coupled to said flexible arm and having an inner surface in close facing relation to said cylindrical surface, said deflection means being responsive to the hydrodynamic force between said inner surface and said headwheel generated by the rotation of said headwheel, for deflecting said free end of said flexible arm, thereby displacing said support surface of said supporting means away from said rotating cylindrical surface.

2. The apparatus according to claim 1 wherein said flexible arm includes a spring member.

3. The apparatus according to claim 2 wherein said spring member is prestressed so that said deflection means inner surface is urged toward said headwheel.

4. The apparatus according to claim 2 wherein said deflection means includes a pad of low-friction plastic bonded to said spring member.

5. The apparatus according to claim 4 wherein said pad includes a concave arcuate surface facing said headwheel cylindrical surface.

6. The apparatus according to claim 1 wherein said support surface of said supporting means includes a chromium plating.

7. The apparatus according to claim 1 wherein said flexible arm comprises a cantilevered beam.

8. In a system for recording information onto, and retrieving information previously stored on, a moving tape, an apparatus comprising:
a fixed base structure;
a headwheel of generally cylindrical shape adapted to be rotated about the axis of said cylinder, said moving tape being wrapped around a peripheral surface of said headwheel in a single helix, said moving tape being hydrodynamically lifted away from said rotating peripheral surface;
means located on said peripheral surface of said headwheel for conveying information between said moving tape and said headwheel;
a flexible arm fixed at one end to said base structure and having a second end free to move toward or away from said headwheel;
means coupled to said flexible arm free end for supporting said moving tape, said supporting means having a support surface adapted to support said moving tape; and
deflection means coupled to said flexible arm and having an inner surface in close facing relation to said headwheel peripheral surface, said deflection means being responsive to the hydrodynamic force between said inner surface and said headwheel generated by the rotation of said headwheel, for deflecting said free end of said flexible arm, thereby displacing said support surface of said supporting means away from said rotating peripheral surface.

9. The apparatus according to claim 8 wherein said flexible arm includes a spring member.

10. The apparatus according to claim 9 wherein said spring member is prestressed so that said deflection means inner surface is urged toward said headwheel.

11. The apparatus according to claim 9 wherein said deflection means includes a pad of low-friction plastic bonded to said spring member.

12. The apparatus according to claim 11 wherein said pad includes a concave arcuate surface facing said headwheel cylindrical surface.

13. The apparatus according to claim 8 wherein said support surface of said supporting means includes a chromium plating.

14. The apparatus according to claim 8 wherein said flexible arm comprises a cantilevered beam.

15. The apparatus according to claim 8 further including first and second fixed means for supporting said moving tape, said first fixed support means supporting said tape in advance of said tape being wrapped around said headwheel, said second fixed support means supporting said tape beyond said wrap around said headwheel.

16. The apparatus according to claim 15 including a plurality of flexible arms and an equal plurality of means for supporting said moving tape, all of said flexible arms being virtually identical and all of said supporting means being virtually identical.

17. The apparatus according to claim 16 wherein said plurality of supporting means are disposed about said headwheel, and wherein the spacings between any adjacent two of said supporting means, between said first fixed means and the adjacent supporting means, and between said second fixed means and the adjacent supporting means, are all substantially equal.

18. The apparatus according to claim 16 further including height adjusting means coupled to said fixed ends of said flexible arms for positioning said support surface of said supporting means adjacent said tape.

19. The apparatus according to claim 8 wherein said headwheel is entirely rotatable.

20. The apparatus according to claim 8 wherein said moving tape is hydrodynamically lifted away from said rotating peripheral surface of said headwheel at a distance which is greater than the displacement of said inner surface of said deflection means from said rotating peripheral surface of said headwheel.

* * * * *